Figure 1:
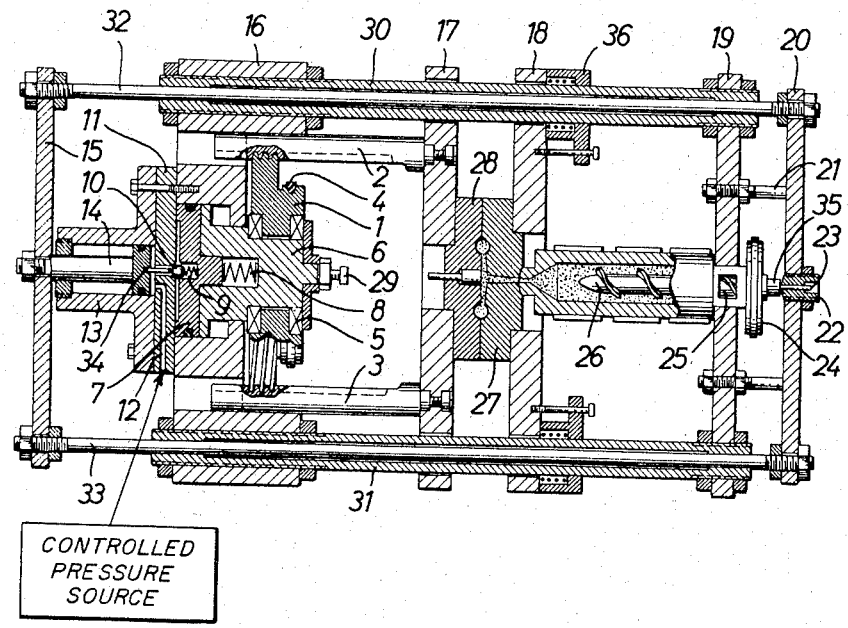

April 2, 1968

P. FLORJANCIC 3,375,757

ACTUATOR, PARTICULARLY FOR A MOLD IN AN
INJECTION-MOLDING MACHINE
Filed Dec. 21, 1964

Inventor
Peter Florjancic
By Stevens, Davis, Miller & Mosher
Attorneys

United States Patent Office 3,375,757
Patented Apr. 2, 1968

3,375,757
ACTUATOR, PARTICULARLY FOR A MOLD IN AN INJECTION-MOLDING MACHINE
Peter Florjancic, Hochblassenstrasse 4, Garmisch-Partenkirchen, Germany
Filed Dec. 21, 1964, Ser. No. 419,826
Claims priority, application Austria, Dec. 31, 1963, A 10,517/63
4 Claims. (Cl. 91—189)

This invention relates to a closing device, particularly for a mold in injection-molding machines.

This invention relates to a closing device, particularly for a mold in injection-molding machines, which device is characterized according to the invention by a worm, which is mounted on a stationary cross-head of the injection-molding machine and coaxial with the axis of the injection-molding cylinder, and which has teeth in mesh with those of push racks connected to the platen.

To enable the exertion of an additional holding pressure at the end of the closing operation, the invention provides for a special design of the means for mounting the screw.

The injection-molding machines now on the market have different types of closing devices, such as hydraulic pistons, toggle joints, screw spindles, bayonet joints, etc. In many types, the final pressure is exerted by a separately controlled hydraulic ram. All these means for closing the mold have the disadvantage that they are necessarily centrally mounted so as to occupy the space behind the movable mold. This space, however, is very important for the ejector. A sufficiently large free space in this area may be provided, of course, by the arrangement of two pistons or two screw spindles, which engage side portions of the movable platen. On the other hand, such a design makes the machine more complicated and expensive; in the case of screw spindles, both must be provided with a transmission to ensure a uniform movement. Such closing devices are controlled by separate devices, which operate independently of the stationary part of the machine.

As contrasted therewith, the closing device according to the invention has the advantage that the closing device driven by a worm is self-locking so that the racks operated by the worm cannot be axially displaced relative to the worm by pressure applied to the racks but only by a rotation of the worm. Besides, any desired, large number of such worm racks can be advanced with exact uniformity by a single, centrally disposed worm and in spite of this central drive of the push racks the space behind the platen is left free; an additional holding pressure can be exerted after the completion of the closing operation if the worm is mounted on a separate hydraulic piston.

In the arrangement described last, the control of the operation of closing the mold can be correlated with the injecting operation in injection-molding machines.

So far, a worm and worm wheel have only been used for transmitting rotation. The novel closing device comprises a worm which has a large diameter and the associated worm wheel has been cut open and extended to form a worm rack, which has teeth in mesh with those of the worm. These worm racks are firmly connected to the movable mold platen. In larger machines, it is obviously possible to provide more than two worm racks on the sides. This provides also for a good support and guidance of the movable platen. As the driving worm is centrally disposed, all worm racks move uniformly so that the movable platen is always lifted and lowered in exact parallelism without danger of canting. The worm having a large diameter, the angle of lead of the teeth of the racks is very small so that the worm is not rotated when pressure is exerted to the racks. Hence, the transmission is self-locking. The arrangement of the worm racks on the sides results in an entirely free space behind the movable platen. This free space is important for the ejector. The worm and its V-belt pulley are integral and are rotatably mounted on a two-part piston held against axial pressure. This piston is larger in diameter than the main hydraulic piston and is connected to the main hydraulic piston by a partition, in which a check valve is mounted. Thus, the two pistons form a hydraulic unit. A hydraulic pressure exerted on the main hydraulic piston is applied to the holding piston through the check valve so that the worm and racks are forced forwardly to produce the holding pressure. This operation is not effected until the worm has mechanically closed the mold. When the main hydraulic piston is relieved of the hydraulic pressure, the check valve prevents a discharge of pressure from the holding piston. As a result, the mold remains locked until a central pin of the returning main hydraulic piston engages the check valve to open the same so that the holding piston is relieved of the hydraulic pressure. The holding piston consists of two parts and is urged by a spring to its initial position. By this operation, the worm is relieved, begins to rotate in the other direction and opens the mold. As is apparent from this description, this worm-operated closing unit is functionally related to the injecting unit. This simplifies the entire machine and enables a control of an injection-molding machine provided with a plasticizing feed screw by a simple hydraulic unit and a simple three-way slide valve.

Figure 2:
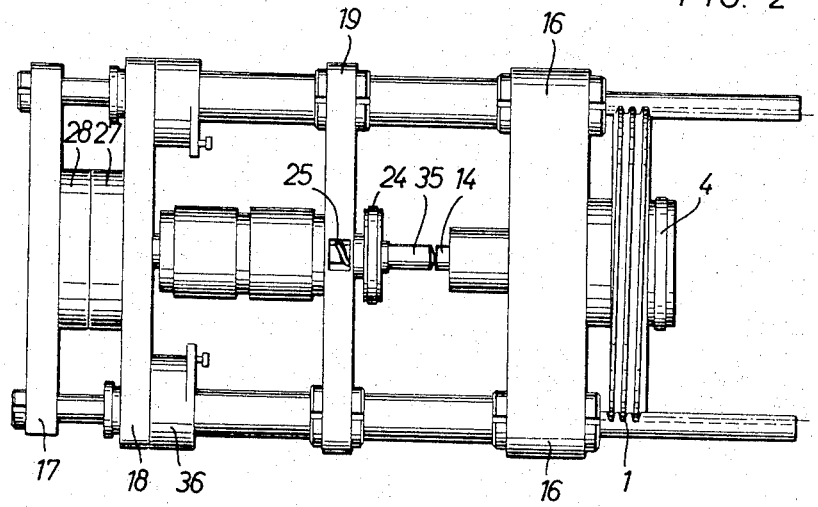

Two embodiments of the invention as applied to an injection-molding machine are shown by way of example on the drawing. FIG. 1 is a transverse sectional view showing an injection-molding machine with a normal plasticizing feed screw. FIG. 2 is a top plan view showing a modification also applied to an injection-molding machine.

In FIG. 1, the worm 1 is driven by a V-belt 4 and mounted on the axis of the piston 6. Thrust bearings 5 are provided to take up axial pressure. The worm 1 is in mesh with two worm racks 2, 3, which have been formed by developing the associated worm wheel into a straight line. These worm racks are mounted in the housing 16 and firmly connected to the movable platen 17. The holding piston 6 is coaxially and telescopically connected to the intermediate piston 7. In the absence of pressure, an interposed spring 8 urges the pistons 6, 7 apart. The cylinder for the intermediate piston 7 is mounted in the housing 16. A partition 11 is disposed between the main hydraulic cylinder 13 and the cylinder of the piston 7. A check valve 9, 10 in this partition is interposed between these two cylinders and separates the same when the valve is closed. The partition 11 is further formed with a bore 12 for the oil supply conduit. The cylinder 13 is firmly connected to the housing 16 by screws. The main hydraulic piston 14 has a relief pin 34, which holds the check valve 9, 10 open in its initial position. The plasticizing feed screw 26 is driven by a V-belt 24 and is mounted in a pot having a feed opening 25. The stroke of the injecting piston 26 formed by the plasticizing feed screw is limited by two adjustable pins 21. This fine adjustment is effected by a micro switch pin 23. The movement of the mold platen 18 is limited by two limiting nuts 36. The housing 16 and the cross-head 19 are firmly connected by two tubes 30, 31. The two mold platens 17, 18 are slidable on the two tubes. The longitudinals 32, 33 extend through and are mounted in these two tubes 30, 31. The piston 6 carries the ejector 29.

The entire operation is performed as follows.

When the worm 1 is rotated by the V-belt 4, the platen 17 carrying the mold section 28 is advanced until the mold section 28 impinges on the other mold section 27. At this time, the spring 8 acts as a buffer to absorb the impact. The spring is compressed, the piston 6 is pushed against the piston 7 and this piston 7 is forced against the partition 11 (position shown in FIG. 1). At this time, the rotation of the worm 1 is stopped and oil pressure is applied through the oil conduit 12 to the cylinder 13. This oil pressure pushes the piston 14 forwardly and applies at the same time a holding pressure through the valve 9, 10 to the intermediate piston 7. The pressure applied to the piston 14 is transmitted by a cross-head 15, the longitudinals 32, 33, the cross-head 20, the adjusting screw 22 and the screw 35 to the feed screw 26, which constitutes an injecting piston and injects the plastic composition from the pot into the closed mold 27, 28. The cylinder 13 is then pressure-relieved so that the check valve 9, 10 is closed. The plasticizing feed screw 26 is now feeding new plastic composition into the pot. As screw 26 rotates and forces new plastic composition to the left as seen in FIGURE 1 to fill the pot, screw 26 (in rotation) reacts against this new material and is forced to the right as seen in FIG. 1. Since cylinder 13 is pressure relieved, the movement of screw 26 effects the movement to the right of piston 14 by virtue of the mechanical connection therebetween. When piston 14 reaches its forward position, the pin 34 opens the ball valve 9, 10 so that the worm 1 is relieved. The worm 1 begins now to rotate in the opposite direction and another injection cycle begins.

In FIG. 2, the same machine elements are designated with the same reference numerals. This embodiment differs from that of FIG. 1 in that the worm 1 acts directly on the longitudinals, which consist in this case of worm racks, and the hydraulic piston acts directly on the plasticizing screw.

The worm 1 and the feed screw may be driven by suitable means, which are not shown because they are known per se. These means may consist, e.g., of electric or hydraulic motors and are controllable to reverse the direction of rotation when required.

The actuator which has been described is not restricted, however, to injection-molding machines, but may be used for the actuation of presses, blow-molding machines, railway switch points or the like.

In all cases, the actuator is self-locking and with a central drive means enables an exact, uniform advance of any desired number of worm racks meshing with the central worm.

What is claimed is:
1. An actuator for a member mounted for reciprocal movement comprising a worm supported substantially fixed in space, bearing means for said worm to enable rotation about its central axis, means to rotate said worm, and at least two toothed push rods with the teeth of each being in mesh with said worm, the push rods being connected to said member whereby rotation of said worm produces a linear motion of said toothed push rods relative thereto to drive reciprocally said member between extreme positions, the diameter of the worm and lead angle of the toothed push rods being such as to provide a mechanical advantage suitable to prevent back pressure on the member from moving the rods and turning the worm.

2. An actuator according to claim 1, characterized in that the worm is coaxially mounted on a controlled hydraulic piston which is operable to control the holding pressure applied through the worm and the associated push rods, and a controlled pressure source means is provided to selectively apply hydraulic pressure to operatively actuate said piston.

3. An actuator according to claim 2, characterized in that a coaxial intermediate piston is telescopically displaceable in the controlled piston in response to hydraulic pressure applied thereto and a spring is disposed between the two pistons to urge the pistons apart when they are pressure-relieved.

4. An actuator according to claim 3, characterized in that the cylinder chamber on the pressure-admitting side of the intermediate piston for transmitting the holding pressure is connected by a check valve to the oil pressure chamber of a third hydraulic piston.

References Cited
UNITED STATES PATENTS

| | | | |
|---|---|---|---|
| 129,339 | 7/1872 | Howkes | 74—424.6 |
| 1,039,948 | 10/1912 | Hunter | 92—75 |
| 2,157,263 | 5/1939 | Jonnson | 74—89.14 |
| 2,202,140 | 5/1940 | Burroughs | 91—189 |
| 2,983,956 | 5/1961 | Vogel et al. | 91—412 |
| 2,994,303 | 8/1961 | Robra et al. | 91—189 |
| 3,020,721 | 2/1962 | Hipp | 91—412 |
| 3,184,810 | 5/1965 | Hoern | 18—30 |

MARTIN P. SCHWADRON, *Primary Examiner.*

PAUL E. MASLOUSKY, *Examiner.*